United States Patent
Pennerath

(10) Patent No.: US 7,111,889 B2
(45) Date of Patent: Sep. 26, 2006

(54) GASKET SEAL WITH POSITIONING STOPS FOR A FIXED WINDOW GLUED TO FLANGES OF AN OPENING

(75) Inventor: Eddy Pennerath, Henriville (FR)

(73) Assignee: Rehau SA, Morhange (FR)

( * ) Notice: Subject to any disclaimer, the term of this patent is extended or adjusted under 35 U.S.C. 154(b) by 22 days.

(21) Appl. No.: 10/502,186

(22) PCT Filed: Jan. 21, 2003

(86) PCT No.: PCT/FR03/00191

§ 371 (c)(1),
(2), (4) Date: Sep. 10, 2004

(87) PCT Pub. No.: WO03/062003

PCT Pub. Date: Jul. 31, 2003

(65) Prior Publication Data

US 2005/0104406 A1 May 19, 2005

(30) Foreign Application Priority Data

Jan. 22, 2002 (FR) .................................. 02 00754

(51) Int. Cl.
*B60J 10/02* (2006.01)
(52) U.S. Cl. ......................................... 296/93; 296/93
(58) Field of Classification Search ................ 296/93, 296/146.15
See application file for complete search history.

(56) References Cited

U.S. PATENT DOCUMENTS

| 4,165,083 | A | * | 8/1979 | Dochnahl | ................... 277/642 |
|---|---|---|---|---|---|
| 4,984,839 | A | * | 1/1991 | Miyakawa et al. | ........... 296/93 |
| 5,395,563 | A | | 3/1995 | Goto et al. | |
| 5,538,314 | A | | 7/1996 | Young et al. | |
| 5,779,297 | A | | 7/1998 | Flauss | |
| 6,095,586 | A | | 8/2000 | Yada et al. | |
| 6,174,477 | B1 | | 1/2001 | Nagahashi et al. | |
| 6,231,117 | B1 | * | 5/2001 | Nagahashi | ................... 296/201 |

FOREIGN PATENT DOCUMENTS

| DE | 34 13 003 | | 10/1985 | |
|---|---|---|---|---|
| EP | 0 117 816 | | 2/1984 | |
| EP | 0 128 837 | | 12/1984 | |
| FR | 2 340 217 | | 2/1976 | |
| JP | 2217375 | * | 10/1989 | ................... 296/93 |
| JP | 403167029 | * | 7/1991 | ................... 296/93 |
| WO | WO 01/85481 A | | 11/2001 | |

* cited by examiner

*Primary Examiner*—H Gutman
(74) *Attorney, Agent, or Firm*—Davis & Bujold, P.L.L.C.

(57) ABSTRACT

The invention relates to a gasket seal (1) in the form of a profile comprising a U-shaped groove (23), which is intended to claim the edge (9) of the window (3) and a flexible masking lip (25) which is used to conceal the gap (8) between the window and the body (5). The inventive seal also comprises a longitudinal rib (29) which is provided with local deformations (30) that act as positioners (17). The method of producing the aforementioned gasket seal comprises a step involving the extrusion of a profile which comprises a U-shaped groove, a flexible masking lip and a continuous longitudinal rib and, subsequently, a step whereby said rib is deformed locally in order to form the positioners. During said deformation step, the rib is flattened locally by a crushing or pinching in order to reduce the thickness thereof and increase the height of same in the relevant area. The invention is particularly suitable for manufactures of motor vehicle accessories.

12 Claims, 5 Drawing Sheets

GASKET SEAL WITH POSITIONING STOPS FOR A FIXED WINDOW GLUED TO FLANGES OF AN OPENING

This application is a national stage completion of PCT/FR03/00191 filed Jan. 21, 2003 which claims priority from French Application Ser. No. 02/00754 filed Jan. 22, 2002.

FIELD OF THE INVENTION

The present invention concerns a perimeter seal surrounding a window installed in the opening of a vehicle body, particularly a windshield, a rear side window, or a back window.

The invention also relates to a particularly advantageous method of manufacturing such a seal.

BACKGROUND OF THE INVENTION

At present, the methods generally used to position fixed windows during course of automobile assembly are completely automated through the use of machine tools.

Fixed windows such as for example, windshields, rear side windows or back windows are now installed using conventional methods of adhering them to a recess in the vehicle body which forming a groove in the opening by means of a peripheral bead of adhesive.

Because of manufacturing allowances in vehicle body construction and the need to leave space for expansion, when the window is positioned there is a relatively large gap between the flange of the window and the end of the vehicle body.

For esthetic reasons, it is preferable to camouflage this gap by covering it with a frame profile or a perimeter seal also called an enhancer which may comprise, for example, a flexible masking lip used to compensate for the allowances.

In addition to their esthetic function, these frame profiles serve the additional purpose of positioning the window when the window is glued to the flanges of the opening in the vehicle body during assembly.

Actually, during the assembly procedure, a bead of adhesive is deposited on the groove in the metal vehicle body. The window is then gripped by a machine tool, generally using suction devices, placed in the opening to be covered, and finally pressed against the bead of adhesive until it is in the desired position.

For reasons related to air flow and esthetics, the industry has sought a way to position windows flush with the vehicle body, without any offset areas or protuberances between the window and the adjacent metal of the body.

Furthermore, in positioning the window, it is important to maintain optimal spacing between the window and the groove in the body so that on the one hand, the bead of adhesive is compressed sufficiently to adhere and form a tight seal between the window and the body, and on the other hand, the window does not exert so much pressure on the still liquid bead of glue that it overflows and drips onto the car body.

For all these reasons, it is desirable to maintain precise spacing between the window and the groove in the body that forms the edge of the opening. Advantageously, the seal may also comprise stop means to regulate this distance.

In the prior art various models of frame elements for maintaining the spacing between the window and the edges of the vehicle body opening have been proposed. For example, such elements have been described in French Patent Application No. 2.340.217 of REGIE NATIONALE DES USINES RENAULT or in European Patent Application No. EP 0.117.816 of VEGLA GmbH.

However, these elements are complex devices formed of several composite pieces. They entail long, expensive manufacturing and placement procedures, adding considerably to both the expense and length of time required to position the window.

SUMMARY OF THE INVENTION

The object of the invention is to furnish a perimeter seal for a fixed window that masks the spaces caused by manufacturing allowances and maintains optimal spacing between the window and the vehicle body, and which also has a simple, economical design and is easy to position.

Another object of the invention is to teach an advantageous method of manufacturing such a seal that is particularly simple, quick and economical.

Another type of seal is also known in the prior art. It will be described in greater detail following this description.

This windshield seal is composed of an extruded polymer profile which surrounds the window on three sides.

One side is U-shaped for attachment to the window and on the other side there is a flexible masking lip with a free end that rests on the metal of the vehicle body in order to mask the esthetically objectionable gap.

On the interior surface, that is, the surface that will be placed towards the interior of the vehicle, this seal comprises several strips forming local stops used to maintain optimal spacing between the seal and the edges of the opening.

This type of seal has numerous advantages. Since it is composed of a single piece of polymer it is quick and easy to install, and it is also satisfactory from a technical point of view.

However, despite the fact that the seal is made of inexpensive primary material and its simple shape adapts well to extrusion manufacturing, production remains relatively burdensome. This is because the wedge strips require an additional notch formation step that is complex and costly to perform after extrusion. In addition, a second step necessitates forming notches to remove the extra rib areas by so that only certain localized portions of them remain in place corresponding to the wedge strips.

The notching step is a slow, delicate operation. It is actually not possible to remove such a long profile in one simple cutting operation. Notching consists of removing the superfluous material by "nibbling" away at it little by little.

The equipment required is complicated and expensive. Additionally, the extrusion process must be synchronized with the tedious notching step, which effectively slows down the entire manufacturing operation.

For all the above reasons, the selling price of these seals, despite their apparent simplicity, is relatively high.

Finally, it seems illogical to shape material into a profile only to remove most of it.

The object of the invention is to teach another type of glued seal for a fixed window, which, like the previous seal, masks the spaces resulting from manufacturing allowances, maintains optimal spacing between the window and the vehicle body, and is simple and quick to install, but which has a substantially lower selling price than the prior art seal.

The invention also teaches a simpler, faster, and more economical method for manufacturing such a seal.

To resolve this technical problem, the seal according to the invention is also in the form of a profile, designed to be attached to the edges of a fixed window covering an opening, specifically the opening in an automobile.

As with the prior art, it comprises a longitudinal groove with a sidewise U-shaped transverse section for attachment to the edge of the window and a masking lip to cover the esthetically objectionable gap that exists between the edge of the window and the gap adjacent to the opening.

According to an essential feature of the invention, it comprises on the surface that will be placed towards the vehicle interior a longitudinal rib with at least one and preferably several local deformations that form one or more positioning stops to maintain optimal spacing between the seal and the flanges of the opening.

Preferably, the at least one deformation is a flat area on the rib that is thinner and higher than the adjacent areas along the rest of the rib, thereby forming a projecting portion that serves as a positioning stop.

The manufacturing method according to the invention comprises a first extrusion step to form a profile comprising a longitudinal groove with a sidewise U-shaped transverse section for attachment to the edge of the window, a masking lip to cover the gap between the edge of the window and the gap adjacent to the opening, and on its interior surface, a continuous longitudinal rib.

In the second step this longitudinal rib is deformed locally in order to form one or more positioning stops.

This deformation step preferably consists of flattening the rib by crushing it or pinching it while the rib is locally flattened until it becomes thinner and taller in a predetermined area and forms a projecting portion that can serve as a positioning stop.

The deformation step is simple, quick, and uses inexpensive material. Unlike notching, it can be easily synchronized with extrusion and does not slow down that process at all. Advantageously, using the method of the invention greatly reduces the individual selling price for such a seal.

BRIEF DESCRIPTION OF THE DRAWINGS

Other features and advantages of the invention will be apparent from reading the following detailed description, with reference to the attached drawings, wherein.

DETAILED DESCRIPTION OF THE INVENTION

Figure 1:
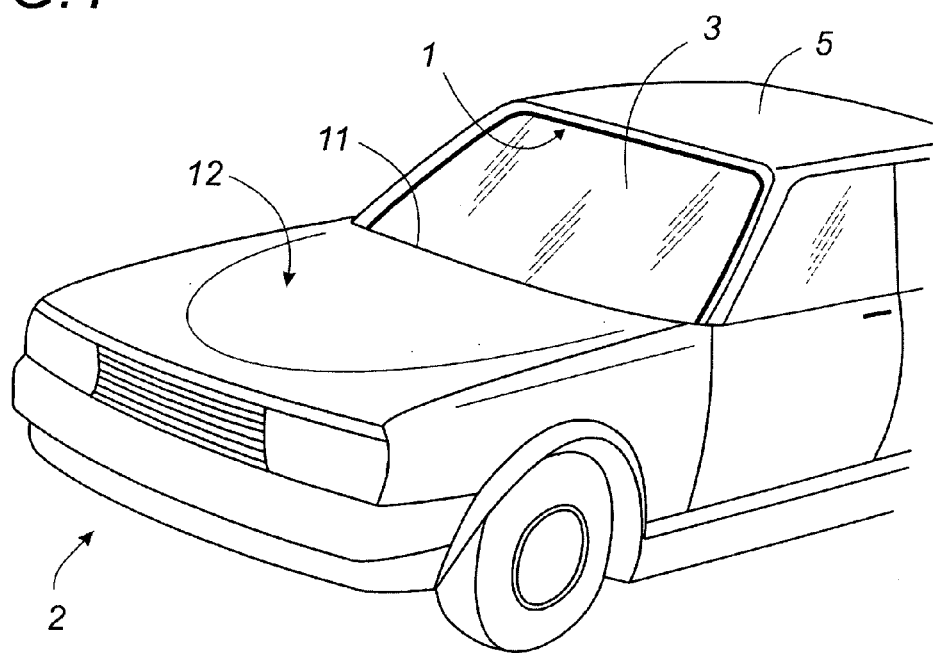
FIG. 1 is a general schematic perspective of the front of an automobile having a windshield equipped with a seal according to the invention.

The sealing device according to the present invention as well as the method of manufacturing it will now be described in detail with reference to FIGS. 1–11. Equivalent elements shown in different drawings will bear the same reference numerals.

These different drawings show a seal 1 for a windshield constituting a preferred embodiment of the invention. It should be noted that these drawings, as well as the detailed description thereof, are in no way limitative of the scope of the invention defined by the claims.

Obviously, the invention is not limited to a seal for a windshield, but can be used for any other type of fixed window installation, such as, for example, rear side windows 33 or back windows 32 for automobiles.

Similarly, the seal of the invention may be used on road vehicles, urban transportation vehicles, railway vehicles, or the like. However, the invention is not limited to the transportation domain—it may have applications in any other sector using adhesive to install fixed windows.

FIG. 1 shows an automobile vehicle 2 with a windshield 3 at the front consisting of a fixed window that is essentially rectangular in shape.

Windshield 3 is placed over an opening 4 formed in the vehicle body 5 and attached to the flanges of the body with adhesive.

Using a conventional method, an adhesive material, preferably a bead of glue 6 such as polyurethane type glue, is deposited along a groove 7 in the metal of the car body 5 bordering the opening to be covered.

Windshield 3 is then positioned on the opening and then pressed against the bead of adhesive 6 until it is in the desired position.

Because of the gaps caused resulting from manufacturing allowances in the metal of vehicle body 5, there remains, when windshield 3 is placed over opening 4, a gap 8 between the edge 9 of the window and shoulder 10 at the beginning of groove 7 of the body.

In order to mask gap 8, which is visible and esthetically objectionable, windshield 3 is equipped with a seal 1 according to the invention that borders it on three sides.

Seal 1 may be a perimeter seal surrounding the entire of window 3, but it may also surround only a portion of the window perimeter.

In the case of a windshield it generally does not extend around the entire periphery, with lower window edge 11 remaining free. Even though it is possible to provide a seal on the fourth side of the window as well, since the gap is hidden by the edge of hood 12, it can remain uncovered.

Figure 2:
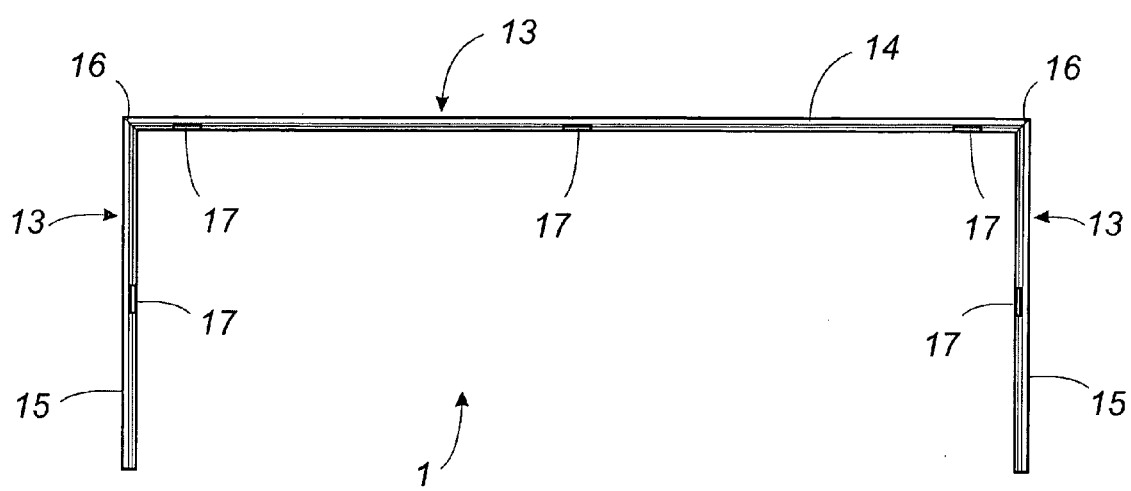
FIG. 2 is a plan view of the interior surface of a seal with three profile portions according to the invention
Figure 12:
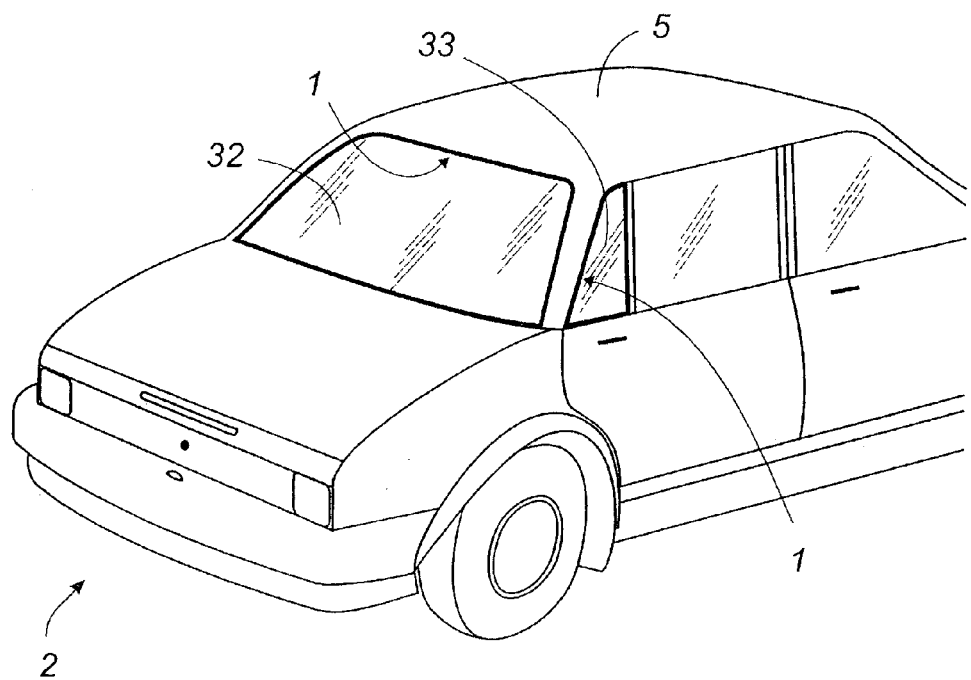
FIG. 12 is a general schematic perspective of the rear of an automobile having rear and side windows equipped with seals according to the invention.
Figure 2A:
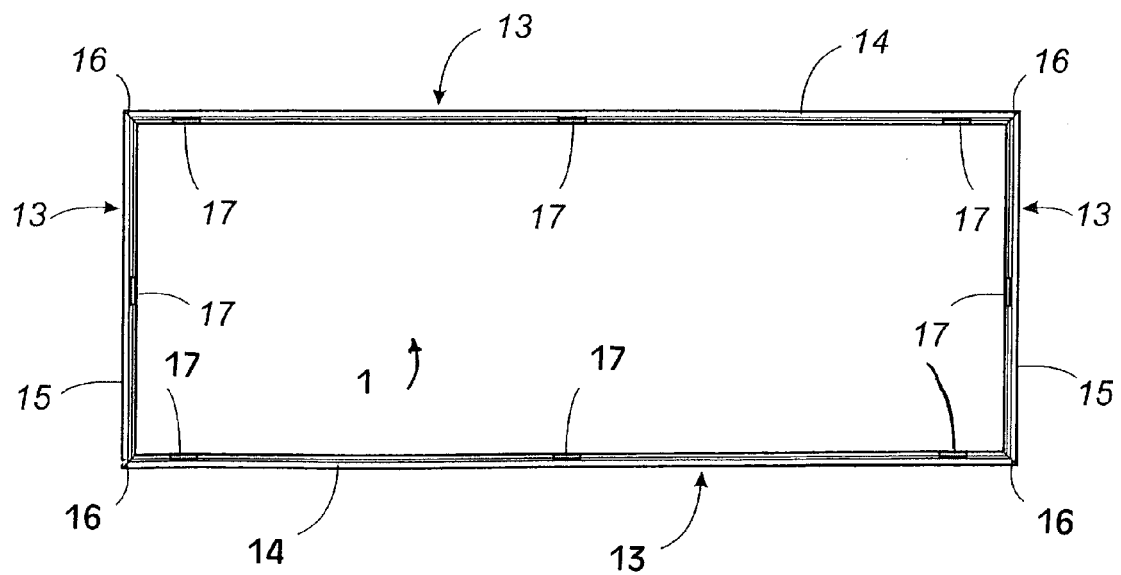
FIG. 2A is a plan view of the interior surface of a seal which surrounds an entire perimeter of a window.
Figure 3:
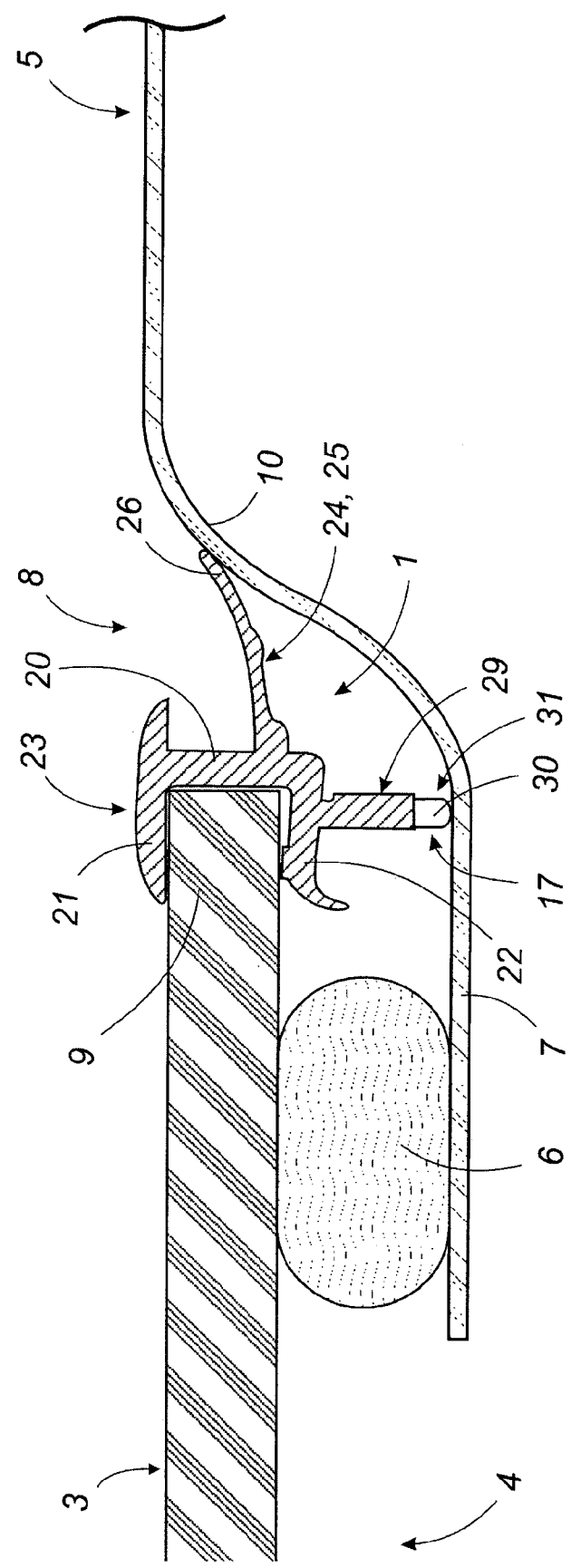
FIG. 3 is a schematic cross-section of one flange of the opening in the automobile body with a fixed window glued in place and with a seal according to the invention attached to the flange.

In FIG. 2 seal 1 is shown by itself. It is composed of three profile portions 13 that have been disposed in such a way as to enclose windshield 3 on three sides.

In the embodiment shown, windshield 3 is essentially rectangular and needs a seal on three sides. Therefore, seal 1 comprises one essentially horizontal profile element 14 and two essentially vertical profile elements 15. These three profile elements 13 are integrated with one another, preferably by soldering their adjacent extremities 16 previously bisected at 450.

Obviously, the seal according to the invention may, without departing from the scope of the invention, consist of a different number of profile elements and/or differently shaped elements in order to adapt to the window to which it will be attached.

Throughout this application, the term "interior surface" will be used to designate the surface of the seal that will be placed facing the interior of the vehicle, and the term "exterior surface" will refer to the surface of the seal that will be placed toward the exterior of the vehicle.

The interior surface of the seal according to the invention is where positioning stops 17 are located; there are five in number in the embodiment shown in FIG. 2.

These positioning stops 17 advantageously maintain optimal spacing between seal 1 and groove 7 of the vehicle body, which it abuts, and thereby maintain optimal spacing between window 3 and vehicle body 5.

These positioning stops 17 are located at precise positions on the seal, selected and imposed for technical reasons and corresponding to areas on the vehicle body where manufacturing standards must be precisely respected with very little allowance. The height of these stops is determined as a function of these standards.

Depending upon the desired application for the seal, a person skilled in the art would have no difficulty adapting the number of positioning stops 17 to distribute along the seal.

Figure 6:
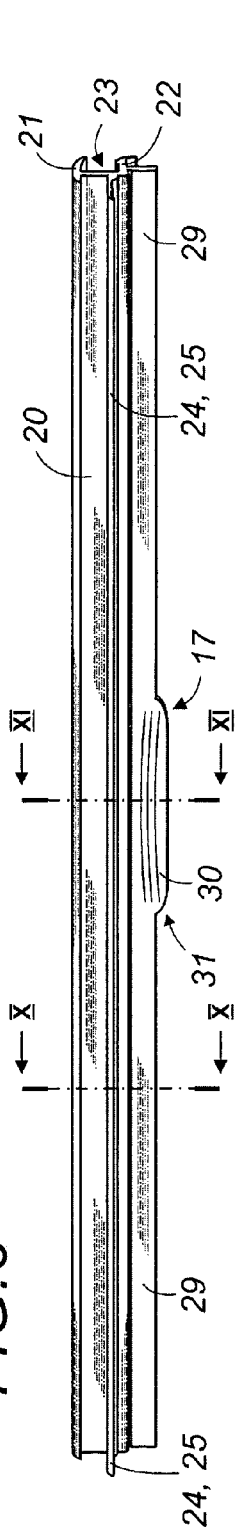
FIG. 6 is a perspective of the side of a seal portion according to the present invention designed for placement toward the vehicle body.
Figure 7:
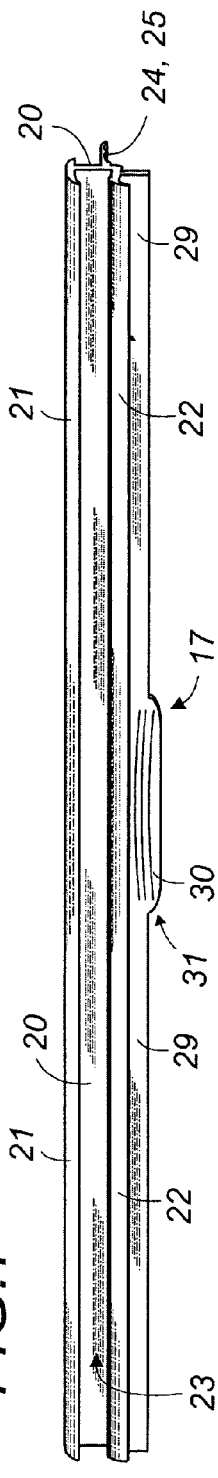
FIG. 7 is a perspective of the side of a seal portion according to the present invention designed for placement toward the window.
Figure 10:
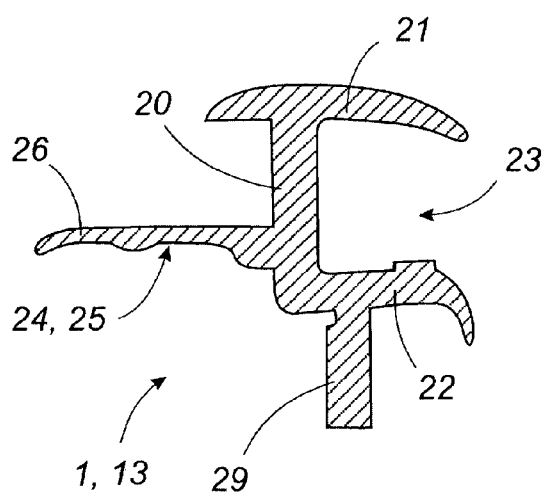
FIG. 10 is a transverse cross-section taken along line X—X of FIG. 6 of a seal according to the present invention at any point along the seal beyond the positioning stops.
Figure 11:
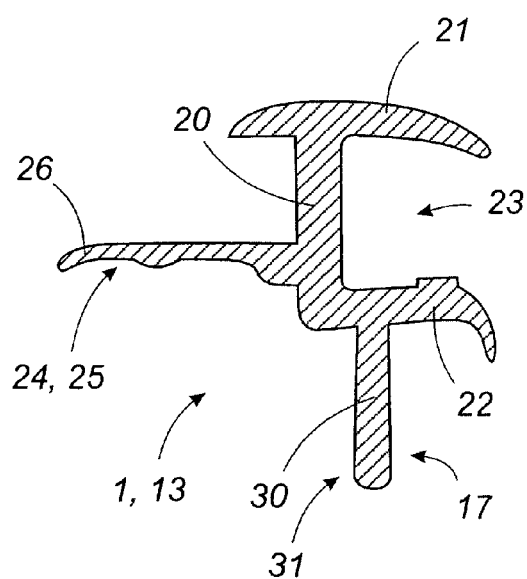
FIG. 11 is a transverse cross-section taken along line XI—XI of FIG. 6 of a seal according to the present invention in the area of the positioning stop.

A profile portion 13 of seal 1 according to the invention has been shown in perspective in FIGS. 6 and 7 and in cross-section in FIGS. 10 and 11.

Figure 4:
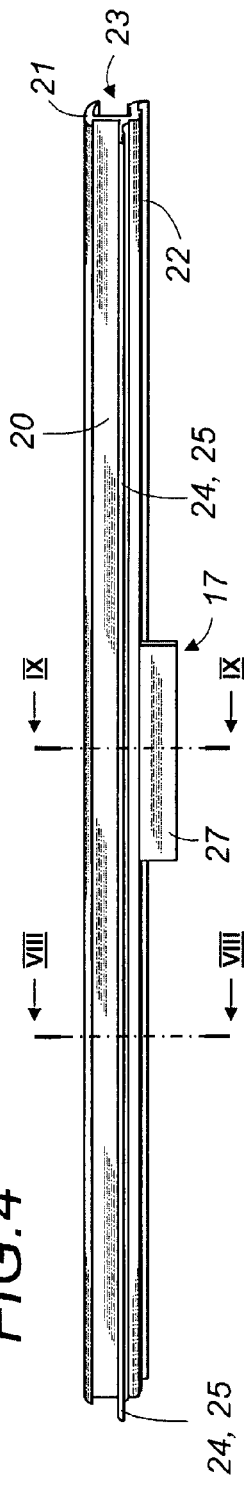
FIG. 4 is a perspective of the side of a seal portion according to the prior art designed for placement toward the vehicle body.
Figure 5:
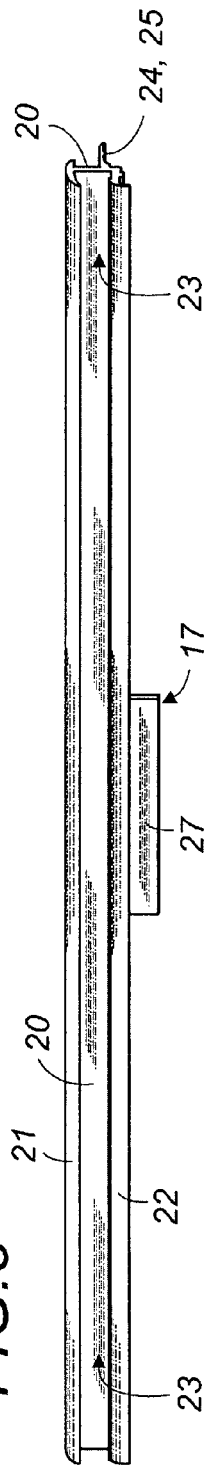
FIG. 5 is a perspective of the side of a seal portion according to the prior art designed for placement toward the window.
Figure 8:
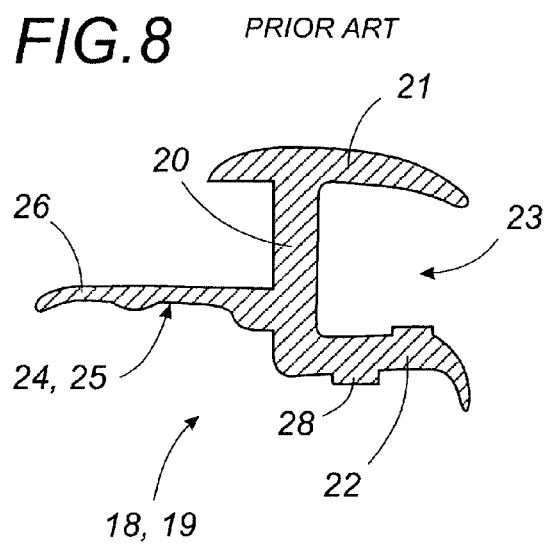
FIG. 8 is a transverse cross-section taken along lines VIII—VIII of FIG. 4 of a seal according to the prior art at any point along the seal beyond the positioning stops.
Figure 9:
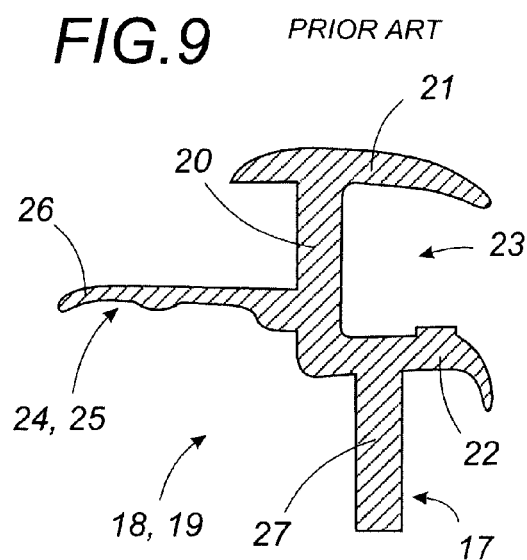
FIG. 9 is a transverse cross-section taken along line IX—IX of FIG. 4 of a seal according to the prior art in the area of a positioning stop.

By way of comparison, a profile portion 18 of a seal 19 according to the prior art has been shown in perspective in FIGS. 4 and 5 and in cross-section in FIGS. 8 and 9.

These portions both comprise an essentially vertical longitudinal wall 20 extending at its extremities into two essentially horizontal longitudinal walls, an exterior wall 21 and an interior wall 22, forming a generally sidewise U-shaped groove 23 opening towards windshield 3.

U-shaped groove 23 is designed so that its receptor cavity receives edge 9 of the windshield and grips it between the groove walls.

From the essentially vertical wall 20 that forms the base of the U, a flexible wall 24 extends towards the vehicle body; the wall is longitudinal and essentially horizontal, and constitutes a flexible masking lip 25 having one free extremity 26 that rests on the metal of the vehicle body 5 in order to mask the esthetically objectionable gap 8 between the windshield and the vehicle body.

Seal 19 of the prior art has in certain places along on its interior surface strips 27 that are essentially rectangular and serve as positioning stops.

As explained in the introductory portion of this application, these strips 27 are formed from a longitudinal rib 28 that is initially the same height as the desired height of strips 27 by forming notches along the entire length of the rib except in the area of strips 27.

As shown, after the notching step, only a very small portion of longitudinal rib 28 outside of strips 27 remains on seal 19 of the prior art.

Conversely, seal 1 of the invention comprises, on its interior surface and essentially along its entire length, a relatively thick longitudinal rib 29.

There are local deformations 30 distributed along said longitudinal rib 29 in locations corresponding to the places where a positioning stop 17 is required.

Preferably, these deformations 30 correspond to the locally flattened areas on rib 29 that are thinner and higher than the rest of the rib. Deformations 30 form projections that serve as positioning stops.

The invention also teaches a particularly advantageous method of manufacturing the seal according to the invention.

The manufacturing method comprises a first extrusion step of forming a profile comprising U-shaped groove 23, a flexible masking lip 25, and continuous longitudinal rib 29.

During the second step this longitudinal rib 29 is locally deformed so as to form positioning stops 17.

During this second step, the rib is locally flattened by crushing or gripping it to reduce the thickness and increase the height in a predetermined location in order to form the projection that serves as a positioning stop. The final height of deformation 30 thus created will be easily established by a person skilled in the art in order to correspond to the desired height of positioning stop 17.

This deformation step preferably is a cold process.

The flattening operation may be performed with a pneumatic press that crushes the rib using the jaws of a gripping tool.

The primary material used to form the seal of the invention must be suitable to be subjected to the two steps of the procedure described previously.

A polymer material capable of extrusion and which can be permanently locally deformed should be used. Certain plastic materials formulated with thermoplastic properties adapt particularly well to this. Among them are charged polypropylene or PVC (polyvinyl chloride).

Once it has been shaped, seal 1 of the invention is attached to the periphery of the window using its U-shaped groove.

Although it has not been shown, an adhesive material may be deposited in the base of groove 23 or on the edge of window 3 to reinforce the bond between window 3 and seal 1.

Once equipped with seal 1, windshield 3 is then grasped by a machine tool, generally using suction, positioned on opening 4 of the vehicle body to be covered, and then pressed against the bead of adhesive 6 previously deposited in groove 7 in the metal of the car body.

Positioning stops 17 formed by local deformations 30 allow the pressure on the bead of adhesive to be adjusted while the window is being precisely positioned. This ensures optimal adhesion of the window.

Windshield 3 shown in the various drawings consists of a simple monolithic window. Nevertheless, it could be any other type of window, such as, for example, a layered windshield or a double window with two juxtaposed plates of glass.

The invention claimed is:

1. A seal for a fixed window (3) for covering an opening (4), of an automobile, the seal comprising a profile (13) comprising a longitudinal groove (23) with a sidewise U-shaped transverse section for attachment to an edge (9) of the window (3) and a masking lip (25) for covering a space (8) between the edge (9) of the window (3) and an adjacent edge (7) of the opening;

wherein a longitudinal rib (29) is provided on an interior surface of the seal, the longitudinal rib (29) has, only in certain discontinuous localized areas, at least one permanent deformation (30) which constitutes an area on the longitudinal rib having a greater height than a height along a remainder of the rib, thereby forming a projecting portion that serves as a positioning stop (17) for maintaining optimal spacing between the seal (1) and the edge (7) of the opening of the automobile; and the at least one permanent deformation (30) is a flattened area on the rib (29) constituting the area of thinner and greater height than the remainder of the rib to thereby form the projecting portion that serves as the positioning stop (17).

2. The seal according to claim 1, wherein the longitudinal rib (29) has a plurality of permanent deformations (30) and each of the plurality of permanent deformations (30) of the longitudinal rib (29) are disposed at precise locations along the seal (1) selected to meet manufacturing standards.

3. The seal according to claim 1, wherein the seal comprises five deformations (30) which each serve as one of the positioning stops (17).

4. The seal according to claim 1, wherein the seal surrounds an entire perimeter of the window (3).

5. The seal according to claim 1, wherein the seal surrounds only a portion of a perimeter of the window (3).

6. The seal according to claim 5, wherein the seal surrounds three sides of the window.

7. The seal according to claim 1, wherein the seal is formed from several profile elements (14, 15) integrated with one another into a unitary seal.

8. The seal according to claim 7, wherein the profile elements (14, 15) are integrated with one another by securing adjacent extremities (15), previously bisected at 45°, with one another.

9. The seal according to claim 1, wherein the seal is formed of a polymer material that is extruded and permanently locally deformed.

10. The seal according to claim 1, wherein the seal is formed of a plastic material having thermoplastic properties.

11. The seal according to claim 1, wherein the seal is made of polypropylene or polyvinyl chloride (PVC).

12. The seal according to claim 1, wherein the seal is used to secure one of a windshield (3), a rear side window and a back window to the opening of the automobile.

* * * * *